United States Patent
McMahon et al.

(10) Patent No.: US 9,917,502 B2
(45) Date of Patent: Mar. 13, 2018

(54) UNIVERSAL SIGNAL PROCESSING SYSTEM AND METHOD

(71) Applicant: Delta Systems, Inc., Streetsboro, OH (US)

(72) Inventors: Michael McMahon, Salem, OH (US); Isaac Kirbawy, Tallmadge, OH (US)

(73) Assignee: Delta Systems, Inc., Streetsboro, OH (US)

( * ) Notice: Subject to any disclaimer, the term of this patent is extended or adjusted under 35 U.S.C. 154(b) by 63 days.

(21) Appl. No.: 14/950,115

(22) Filed: Nov. 24, 2015

(65) Prior Publication Data

US 2016/0226369 A1    Aug. 4, 2016

Related U.S. Application Data

(60) Provisional application No. 62/109,154, filed on Jan. 29, 2015.

(51) Int. Cl.

| | |
|---|---|
| *G04G 19/02* | (2006.01) |
| *H02M 1/14* | (2006.01) |
| *H02M 7/219* | (2006.01) |
| *B60K 35/00* | (2006.01) |
| *F02D 41/02* | (2006.01) |
| *G04G 11/00* | (2006.01) |
| *H02M 1/00* | (2006.01) |

(Continued)

(52) U.S. Cl.
CPC ............... *H02M 1/14* (2013.01); *B60K 35/00* (2013.01); *F02D 41/02* (2013.01); *H02M 7/219* (2013.01); *F02D 2041/228* (2013.01); *F02N 11/0848* (2013.01); *H02M 2001/0003* (2013.01)

(58) Field of Classification Search
CPC .......... G06F 7/00; H03K 17/78; H02M 7/217; G04F 8/00; G04F 10/00; G04F 10/04; G04F 10/10; G04G 11/00; G04G 19/00; G04G 19/02; G04G 19/06; Y02T 10/7208; Y02T 10/88; H02J 7/1438; H02J 7/1446

See application file for complete search history.

(56) References Cited

U.S. PATENT DOCUMENTS 5,808,881 A * 9/1998 Lee ........................... G06F 1/26
                                                              323/902
6,377,168 B1   4/2002 Harvey
6,609,357 B1   8/2003 Davis et al.
(Continued)

*Primary Examiner* — Gary L Laxton
(74) *Attorney, Agent, or Firm* — Tarolli, Sudheim, Covell & Tummino LLP; John A. Yirga, Esq.

(57) ABSTRACT

One aspect of the present disclosure can include an electronic signal processing system and method used in a control system (e.g., for hour meter functionality, intelligent start/stop functionality, etc.). The system can include a rectifier component to receive a voltage input from an operation source during use. The voltage input can indicate that an engine is running. The rectifier component to convert the voltage input to a positive voltage input. The system can also include a constant current component to receive the positive voltage input from the rectifier circuit and to control a current based on the positive voltage input. The system can also include an optical component to provide an output based on the current and to communicate the output to a microcontroller during use of the operation source. For example, electronic signal processing methods and apparatuses are also described.

20 Claims, 7 Drawing Sheets

(51) Int. Cl.
*F02N 11/08* (2006.01)
*F02D 41/22* (2006.01)

(56) References Cited

U.S. PATENT DOCUMENTS

| | | |
|---|---|---|
| 7,034,674 B2 | 4/2006 | Harvey |
| 7,154,814 B2 | 12/2006 | Straka |
| 7,812,473 B2 | 10/2010 | Larsen et al. |
| 2011/0046832 A1* | 2/2011 | Francoeur ............... B60K 35/00 701/22 |

* cited by examiner

UNIVERSAL SIGNAL PROCESSING SYSTEM AND METHOD

CROSS REFERENCES TO RELATED APPLICATIONS

The following application claims priority to co-pending U.S. Provisional Patent Application Ser. No. 62/109,154 filed Jan. 29, 2015 entitled UNIVERSAL SIGNAL PROCESSING SYSTEM AND METHOD. The above-identified application is incorporated herein by reference in its entirety for all purposes.

TECHNICAL FIELD

The present disclosure relates to a universal signal processing system and method of operation, and in particular, a universal signal processing system employed to sense when an engine used in outdoor power equipment is operating. In one example embodiment, the universal signal processing system is coupled with a control system to instruct a microprocessor to perform functionality (e.g., of an hour meter, an engine control unit, or the like).

BACKGROUND

Engine operating time hourmeters frequently are used in outdoor power equipment to monitor engine run time to let the owner and/or manufacturer of the outdoor power equipment monitor how long the engine has run, when the equipment is due for repair/maintenance service, and whether the equipment is still under warranty. Examples of outdoor power equipment can include, but are not limited to, tractors, lawn and garden tractors, all terrain vehicles (ATVs), mowers, push mowers, marine vehicles, boats, jet skis, and the like.

Different engines can generate different signals that the hour meter can use to monitor the engine run time. Older carbureted engines can generate high voltage, positive or negative magneto pulses, which can indicate the engine is running. Newer electronic fuel injection (EFI) engines can generate a low voltage signal to indicate that the engine is running. Other types of engines can emit other types of signals to indicate that the engine is running, such as a signal related a fuel pump or other component being activated, or a signal related to a key being turned on. However, hour meters generally cannot detect more than one type of signal. Accordingly, to detect the different types of signals, manufacturers generally have employed different hour meters with special circuitry to detect each of the different types of signals.

Further discussion relating to the developments in the hour meter are found, for example, in U.S. Pat. Nos. 7,812,473, 7,154,814, 7,034,674, 6,609,357, and 6,377,168, all assigned to the Delta Systems, Inc. of Streetsboro, Ohio (hereinafter collectively "Patents"). The Patents are incorporated herein by reference in their entirety.

SUMMARY

One aspect of the present disclosure includes an electronic signal processing system. For example, the electronic signal processing system can be employed with an hour meter system in outdoor power equipment to tell an hour meter when to keep track of time. In another example, the electronic signal processing system can be employed as a feedback mechanism for start engine and stop engine functions (e.g., within an engine control unit that can be used for an intelligent starting and stopping application). The system can include a rectifier component to receive a voltage input from an operation source during use. The voltage input can indicate that an engine is running. The rectifier component converts the voltage input to a positive voltage input. The system can also include a constant current component to receive the positive voltage input from the rectifier circuit and to control a current based on the positive voltage input. The system can also include an optical component to provide an output based on the current and to communicate the output to a microcontroller during use of the operation source.

Another aspect of the present disclosure includes method for electronic signal processing. For example, the method for electronic signal processing can be employed with an hour meter system in outdoor power equipment to tell an hour meter when to keep track of time. As another example, the method for electronic signal processing can be used with an engine control unit in outdoor power equipment to facilitate an intelligent start/stop application. The method can include receiving, at a rectifier component of a circuit, a voltage input from an operation source during use, the voltage input indicating an engine is running. The method can also include converting, by the rectifier component, the voltage input to a positive voltage input. The method can also include controlling, by a constant current component of the circuit, a current provided to an optical component of the circuit based on the positive voltage input. The method can also include providing, by the optical component, an output based on the current. The method can also include communicating, by the optical component, the output to a microcontroller during use of the operation source.

A further aspect of the present disclosure includes an electronic signal processing device. For example, the electronic signal processing device can be employed with an hour meter system in outdoor power equipment to tell an hour meter when to keep track of time. As another example, the method for electronic signal processing can be used with an engine control unit in outdoor power equipment to facilitate an intelligent start/stop application. The device can include a rectifier component to receive a voltage input from an operation source during use. The voltage input can indicate that an engine is running. The rectifier component converts the voltage input to a positive voltage input. The device can also include a constant current component to receive the positive voltage input from the rectifier circuit and to control a current based on the positive voltage input. The device can also include an optical component to provide an output based on the current and to communicate the output to a microcontroller during use of the operation source.

While another aspect of the present disclosure includes an electronic signal processing device comprising a rectifier component to receive a voltage input from an operation source during use. The voltage input indicating an engine is running, and when the voltage input is negative voltage, the rectifier component converting the negative voltage to a positive voltage input and when the voltage input indicating the engine is running is a positive voltage input, transferring the positive voltage input a constant current component. The constant current component receives the positive voltage input from the rectifier circuit and controls a current based on the positive voltage input. The device further comprises an optical component to provide an output based on the current and to communicate the output to a microcontroller during the use of the operation source.

BRIEF DESCRIPTION OF THE DRAWINGS

The foregoing and other features and advantages of the present disclosure will become apparent to one skilled in the art to which the present disclosure relates upon consideration of the following description of the disclosure with reference to the accompanying drawings, wherein like reference numerals refer to like parts unless described otherwise throughout the drawings and in which.

Figure 1:
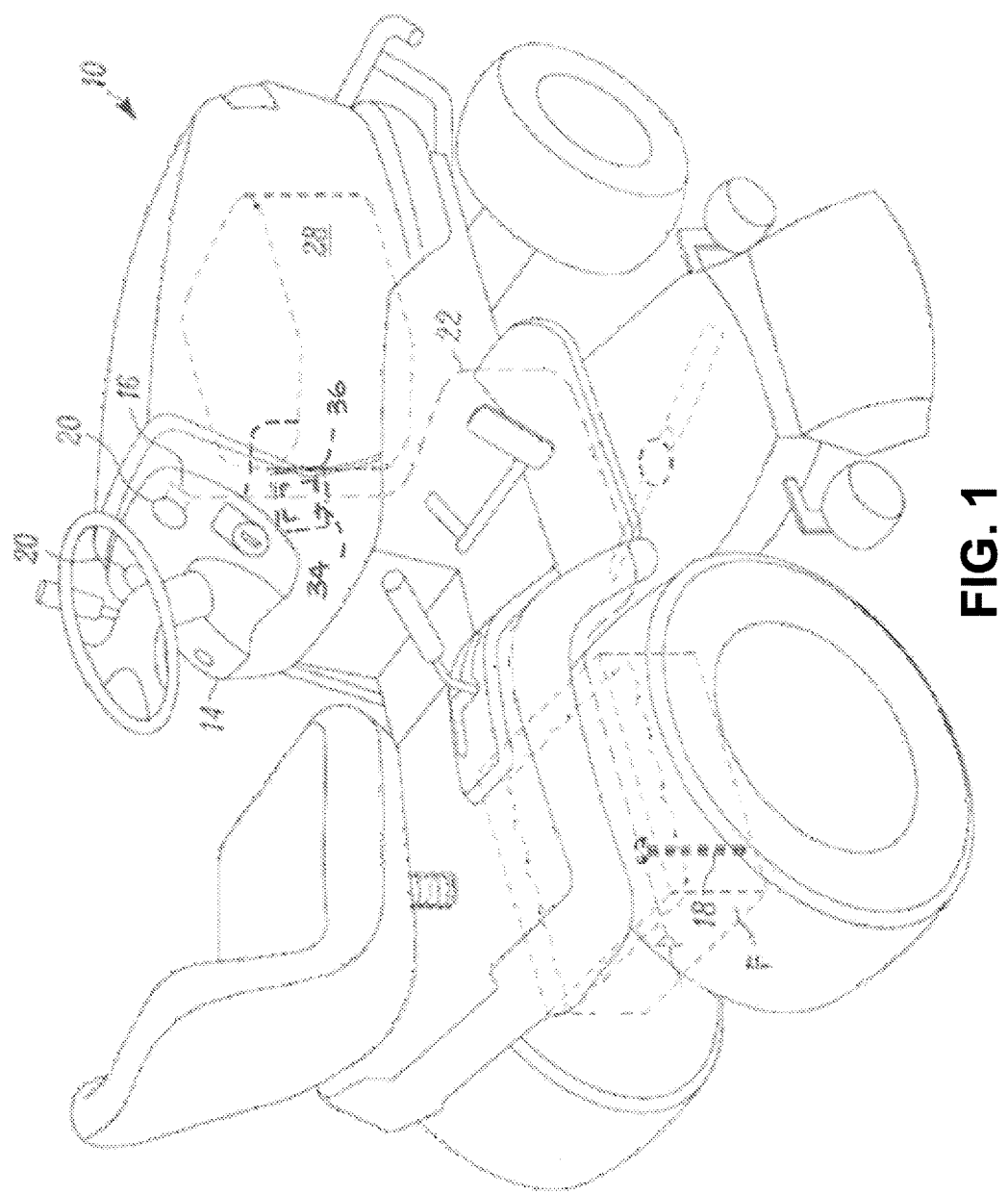
FIG. 1 is a schematic illustration of an example of power equipment in accordance with an aspect of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Referring now to the figures generally wherein like numbered features shown therein refer to like elements throughout unless otherwise noted. The present disclosure relates to a universal signal processing system and method of operation, and in particular, a universal signal processing system employed to sense when an engine used in outdoor power equipment is operating. In one example embodiment, the universal signal processing system is coupled with an hour meter system to instruct the hour meter when to track time of the engine operation. In another example embodiment, the universal signal processing system is coupled with an engine control unit to instruct the engine control unit when to perform an intelligent engine starting/stopping operation.

With reference now to the figures and in particular to FIG. 1, illustrated is an example of power equipment 10 in accordance with an aspect of the present disclosure. As illustrated, the power equipment 10 is a lawn tractor. However, the power equipment 10 can be any machine with an engine without departing from the spirit and scope of the present disclosure. Examples of different machines with engines include, but are not limited to, a riding lawn mower, an agricultural tractor, a snowmobile, a jet ski, a boat, an all terrain vehicle, a bulldozer, a generator, and the like.

The power equipment 10 can utilize an hour meter to tell the owner and/or manufacturer the total operating time of the engine 28, when the equipment is due for repair/maintenance service, and whether the equipment is still under warranty. The hour meter system can measure and display power equipment engine operating time. For example, a physical hour meter 20 can be located on the external profile of the power equipment 10, such as a dash panel 14. The hour meter can display, via a liquid crystal display, an accumulated amount of time that the engine has been operating (e.g., engine run time). Alternatively, the hour meter can provide the total operating time through a wireless signal transmitted by the power equipment 10 or to a plug-in coupled to the power equipment wiring harness 22. The power equipment 10 can perform other functionalities, including an intelligent engine starting/stopping application (e.g., via an engine control unit), additionally or alternatively to the hour meter.

Different engines can generate different signals that the hour meter can use to monitor the engine run time. For example, older carbureted engines can generate positive or negative high voltage magneto pulses, which the hour meter can use as an indication to start monitoring time. Newer engines can incorporate electronic fuel injection can generate signals of a low voltage signal levels, which the hour meter can use as an indication to start monitoring time. The hour meter can also use other indications to start monitoring time, such as a signal related to a fuel pump or other component being activated, or even if a key switch is turned on. These different signals can have different characteristics, such as high positive voltage, high negative voltage, low positive voltage, low negative voltage, pulsed voltage, or direct current (DC) voltage, etc. Traditionally, multiple modules, each with different, special circuitry, were necessary for the different engine types or different types of signals (collectively "operating source").

The present disclosure uses an electronic signal processing system (e.g., a circuit) 36 such that only one model of control system 34 (e.g., for an hour meter, an engine control unit, an intelligent engine starting/stopping application, or the like) is required to handle the various signals emitted by the different operating source 32, such as engine types or operation signals. For example, the electronic signal processing system 32 can be a device that can interface with the engine 28 of the power equipment 10 through the wiring harness 22.

Figure 2:
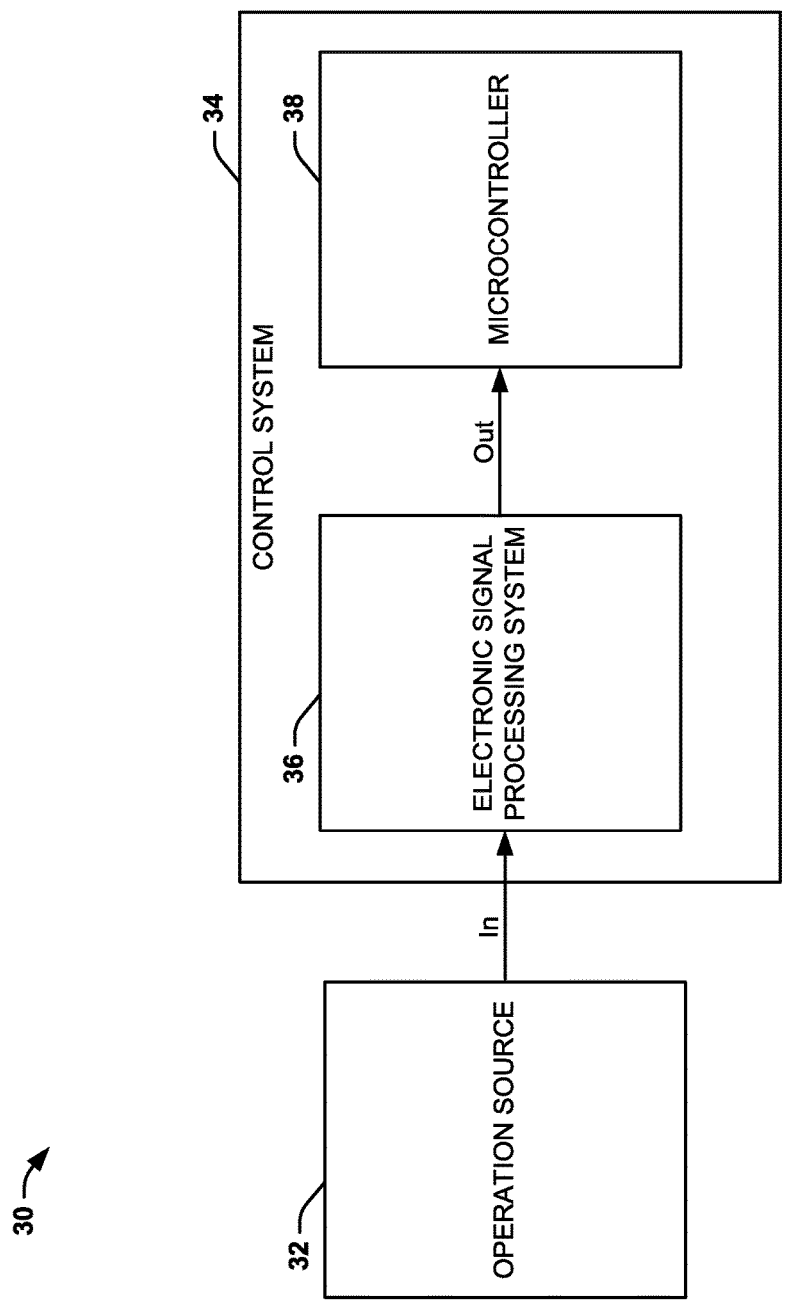
FIG. 2 is a block diagram of an example of a control system in accordance with an aspect of the present disclosure.

FIG. 2 is a block diagram 30 of an example of an control system 34 in accordance with an aspect of the present disclosure. In some instances, the control system 34 can be an hour meter system that can signal the microcontroller 38 to start keeping track of time, keep track of time, or end keeping track of time. In other instances, the control system 34 can be an engine control unit (e.g., to perform applications, such as intelligent starting and stopping of the engine). For example, when a starter module applies voltage to a starter, the control system 34 can give feedback that the engine 28 has started, and the microcontroller 38 can turn off the starting voltage. In another example, if the engine 28 stalls, the control system 34 (e.g., through the microcontroller 38) can take the necessary action, for example, executing a shutdown of the engine.

The control system 34 can be communicatively coupled to an operation source 32. The operation source 32 can provide one or more signals indicating that the engine 28 is running. In some instances, the operation source 32 can be the engine itself. In other instances, the operation source 32 can be a component of the power equipment 10 that can indicate when the engine is running (e.g., a fuel pump, a key, an electronic fuel injector, a spark or a glow plug signal, a positive or a negative magneto pulse, a DC square wave, a constant voltage from a key, an engine oil pressure switch, a fuel switch, etc.).

When the engine 28 is running, the operation source 32, such as a fuel pump 18 that provides fuel F to the engine can generate an input signal (In) that can indicate that the engine is running. For example, the input signal (In) cars have a high positive voltage, a high negative voltage, a low positive voltage, a low negative voltage, a pulsed voltage, a direct current (DC) voltage, etc. The input signal (In) can be sent from the operation source 32 to an electronic signal processing system 36 of the control system 34.

The electronic signal processing system 36 can receive any of the types of input signal (In), such as a high positive voltage, a high negative voltage, a low positive voltage, a low negative voltage, a pulsed voltage, or a direct current (DC) voltage, etc., and process the input signal to an output signal (Out) that can be received by a microcontroller 38. Upon receiving the output signal (Out), the microcontroller 38 can start recording time because an output signal (Out) (positive or negative) indicates that the engine is running. The microcontroller 38 can perform the functionality of the control system 34 (e.g., hour meter functionality, intelligent start/stop functionality, etc.) based on receipt of the output signal (Out) to an input of the microcontroller. In some instances, the microcontroller 38 can track the time that the engine is running while receiving the output signal (Out). In other instances, the microcontroller 38 can track the time that the engine is running based on receiving a discrete instance of the output signal (Out) indicating that the engine is running.

Figure 3:
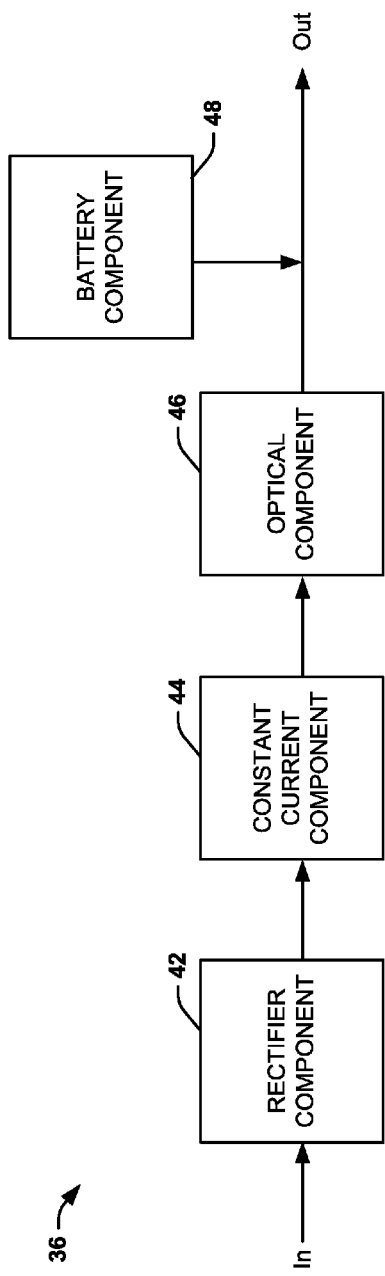
FIG. 3 is a block diagram of an example of the electronic signal processing system of FIG. 2.

A block diagram of an example of the electronic signal processing system 36 is shown in FIG. 3. The input signal (In) can be received by a rectifier component 42 when the operation source 32 is in use. In some instances, the input signal (In) can include a voltage signal that can indicate that an engine is running. For example, voltage signal can include a high positive voltage, a high negative voltage, a low positive voltage, a low negative voltage, a pulsed voltage, or a direct current (DC) voltage, etc.

In some instances, the rectifier component 42 can include a bridge rectifier circuit. For example, the bridge rectifier circuit can include a plurality of diodes. As another example, the bridge rectifier circuit can include four diodes. In this example, two of the four diodes can be polarized in one direction, while the other two of the four diodes can be polarized in another direction.

The rectifier component 42 can convert the input signal (In) to a positive voltage input. For example, the input signal (In) can include a negative voltage (e.g., a negative magneto signal). When the input signal (In) includes a negative voltage, the rectifier component 42 can convert the negative voltage to a positive voltage. When the input signal (In) includes a positive signal, the rectifier component 42 passes the signal to a constant current component 44. Stated another way, whether the input signal (In) is negative or positive, the rectifier component 42 converts the signal to a constant current component 44.

The constant current component 44 can receive a positive signal from the rectifier component 42. The constant current component 44 can control a current supplied to an optical component 46 based on the positive signal. In some instances, the constant current component 44 can limit the current supplied to the optical component 46 based on the positive signal. The constant current component 44 can include circuit components that can control and/or limit current supplied to the optical component 46. For example, the constant current component 44 can include a Zener diode, at least two resistors, and at least one transistor.

The optical component 46 can provide an output (Out) based on the current. For example, when a certain level of current is received, the optical component can be activated to provide the output signal (Out). The output (Out) can indicate that the operation source is being used, which can correspond to the engine being used. The optical component 46 can communicate the output signal (Out) to the microcontroller 38. The microcontroller 38 can be triggered to record the engine on time upon receiving the output signal (Out).

Figure 4:
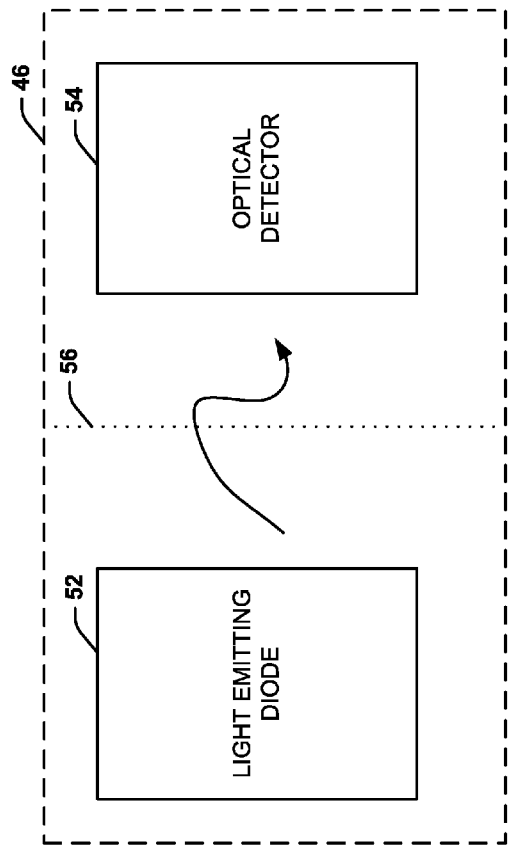
FIG. 4 is a block diagram of an example of the optical component of the electronic signal processing system of FIG. 3.

In some instances, as shown in FIG. 4, the optical component 46 can include a light emitting diode 52 and an optical detector 54. In some instances, the light emitting diode (LED) 52 and the optical detector 54 can be fabricated in one package or integrated circuit. In other instances, the light emitting diode 52 and the optical detector 54 can be individual components. The light emitting diode 52 can be activated to emit light when the current is received. In some instances, the light emitting diode 52 can be activated to emit light when the current is received corresponding to a proper level of current. The optical detector 54 can receive the emitted light and produce the output signal (Out) in response to the emitted light. In some instances, the optical detector can be any type of photosensor. For example, the optical detector can be a phototransistor, a photodariington transistor, or the like. In some instances, the LED 52 and the optical detector 54 can be optically isolated (e.g., using an optional optical isolation mechanism 56).

In some instances, the optical component 46 (including the LED 52 and the optical detector 54) can isolate the ground of the battery component 48 of FIG. 3 from the common of the constant current component 44 and the LED 52 of the optical component 46. This allows the constant current component 44 to output a certain current (e.g., the proper current to activate LED 52) without being grounded along the path between the constant current component 44 and the LED 52. As such, an optical isolation mechanism 56 can be created.

For example, at high input voltages (e.g., 350 V from a magneto), the Zener diode can be forward biased to provide the constant current function. In other examples, at lower input voltages (e.g., 3V, 5V, 12V, etc.), the constant current function is not in effect, but there is sufficient voltage to turn on the transistor and drive the LED 52 of the optical component 46 so that an optical isolator 56 still functions properly and the low level input voltage (In) is still capable of being sensed. When high voltages are applied (e.g., 350 V from a magneto), the current is limited by virtue of the constant current component 44.

Figure 5:
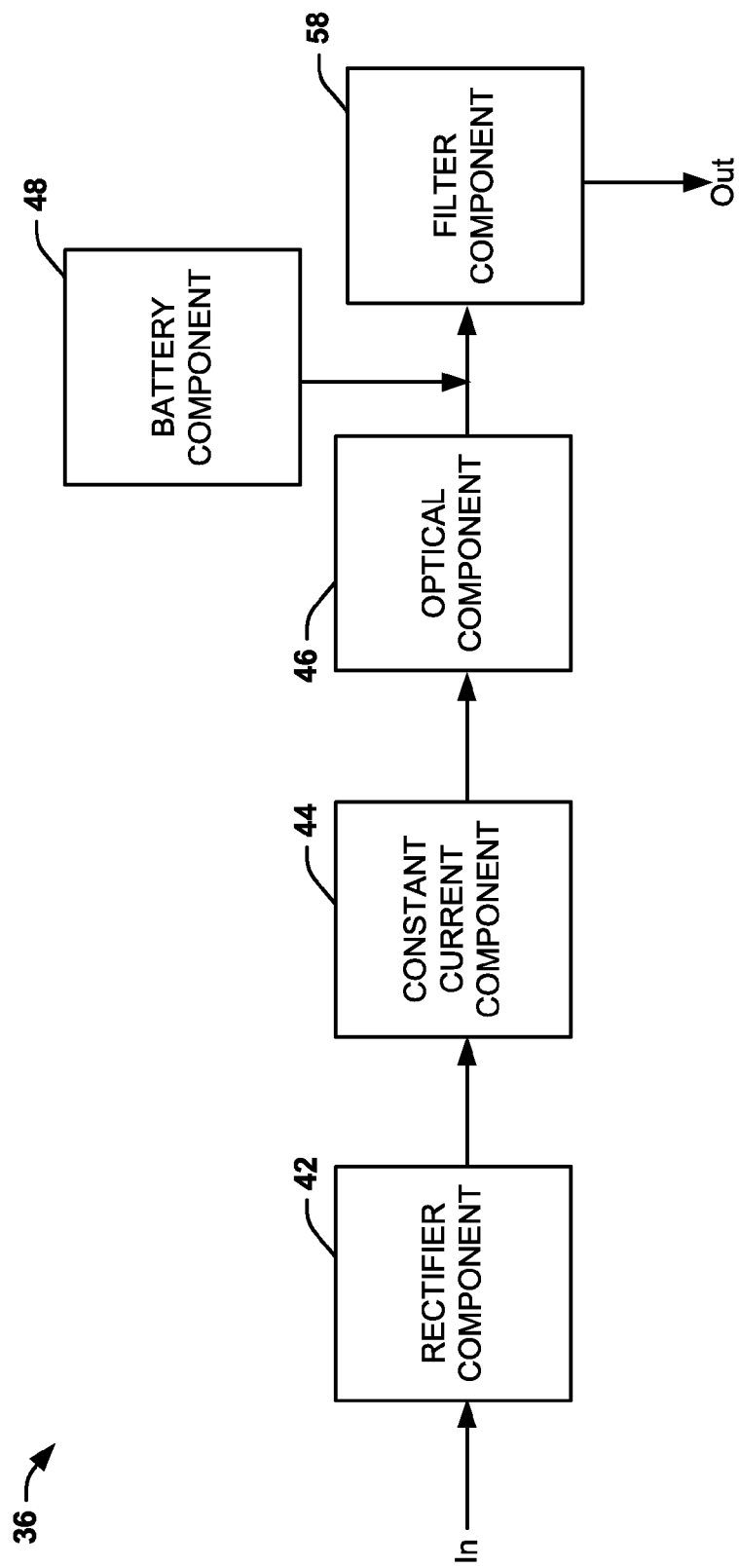
FIG. 5 is a block diagram of another example of the electronic signal processing system of FIG. 2.

The output signal (Out) of the optical component 46 (or the optical detector 54) can be input to the microcontroller 38 of FIG. 2 for sensing applications. In some instances, the output signal (Out) as shown in FIG. 5, the output signal (Out) can be provided to a filter component 58 before being input to the microcontroller 38. In some instances, the filter component 58 can include electronic circuit components configured to filter noise from the output signal (Out). The filter component 58 can include different electronic circuit components depending on which type of noise is desired to be removed from the output signal (Out). In the simplest terms, the filter component 58 can include one or more capacitors. However, the filter component 58 can include any components that can constitute and/or be part of a low pass filter, a bandpass filter, and/or a high pass filter.

Figure 6:
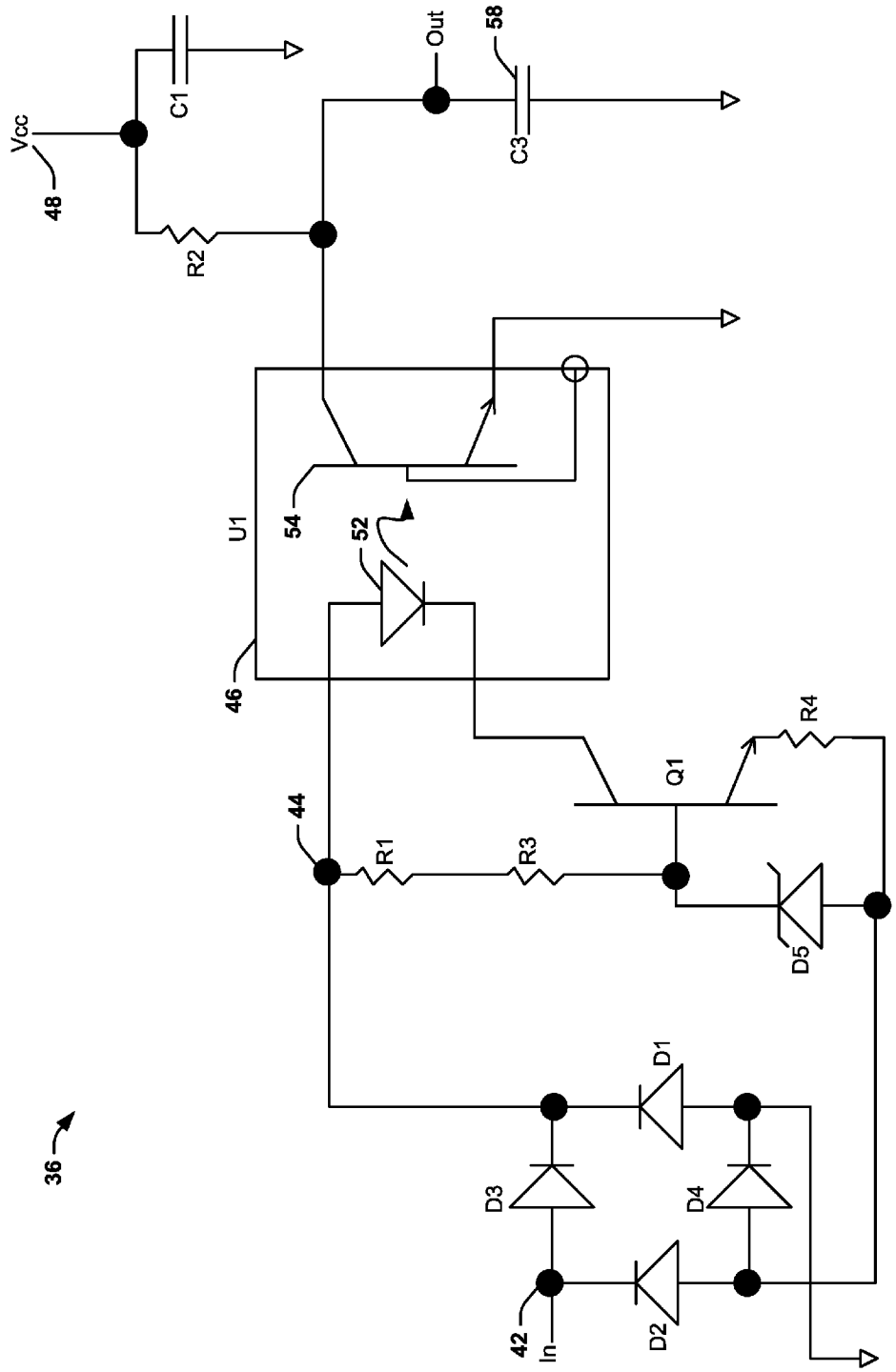
FIG. 6 is an example circuit diagram of the electronic signal processing system of FIG. 5.

An example circuit configuration of the electronic signal processing system 36 is shown in FIG. 6. It will be recognized that other circuit configurations can be used to constitute the electronic circuit system, and the example shown in FIG. 6 is just one of many potential circuit configurations.

The input signal (In) (e.g., a high positive voltage signal, a high negative voltage signal, a low positive voltage signal, a low negative voltage signal, a pulsed voltage signal, a direct current (DC) voltage signal, etc.) can be provided to the rectifier component 42. The rectifier component 42 can be a diode rectifier bridge constructed of four diodes (D1-D4). In some instances, the diode rectifier bridge can be in integrated circuit (IC) form with the four diodes in one package. In other instances, the four diodes of the diode rectifier bridge can be individual discrete diodes.

The constant current component 44 can provide a constant current source for driving LED 52 in the optical component 46 (U1) can include two resistors (R1 and R3, however could include just one resistor), a Zener diode (D5), a transistor (Q1), and another resistor (R4). The constant current is primarily defined by the Zener diode (D5) across the parallel components consisting of the base-emitter junction of the transistor (Q1) and the resistor (R4). It will be understood that the constant current component 44 can include other configurations. For example, in some instances, the Zener diode (D5) can be replaced by single or series PN junctions, transistors, or diodes that can yield the desired Zener voltage. In other instances, the Zener diode (D5) can be replaced by a voltage reference yielding the desired Zener voltage. In some instances, the transistor (Q1) can be a single transistor. In other instances, the transistor (Q1) can be multiple transistors in parallel. The number of transistors can depend on the heat dissipation required based on the input voltage (In). In still other instances, the transistor (Q1) can be multiple transistors in series. The number of transistors can depend on the voltage required for the transistors to handle (e.g., the higher the voltage, the more transistors required).

The optical component 46 (U1) can be used for optical isolation. The optical isolation is due to the anode of the Zener diode (D5) and the low side of the resistor (R4) are not at the battery ground potential because of the bridge rectifier circuit. The transistor (making up optical detector 54) in the optical component 46 (U1) responds to the LED light and turns "on" accordingly when sufficient current flows through the LED 52. The collector of the transistor (of optical detector 54) is pulled high by the resistor (R2). The output signal from the junction of the transistor (of optical detector 54) and the resistor (R2) is then read by the microcontroller (Out). In some instances, the output signal (Out) can be further processed or filtered by additional circuitry (e.g., capacitor (C3) can be used for further filtering of the signal or for converting the signal to direct current (DC)). The microcontroller can sense the primary input activity via the circuitry (Out) and can update the timekeeping when the activity is determined.

Figure 7:
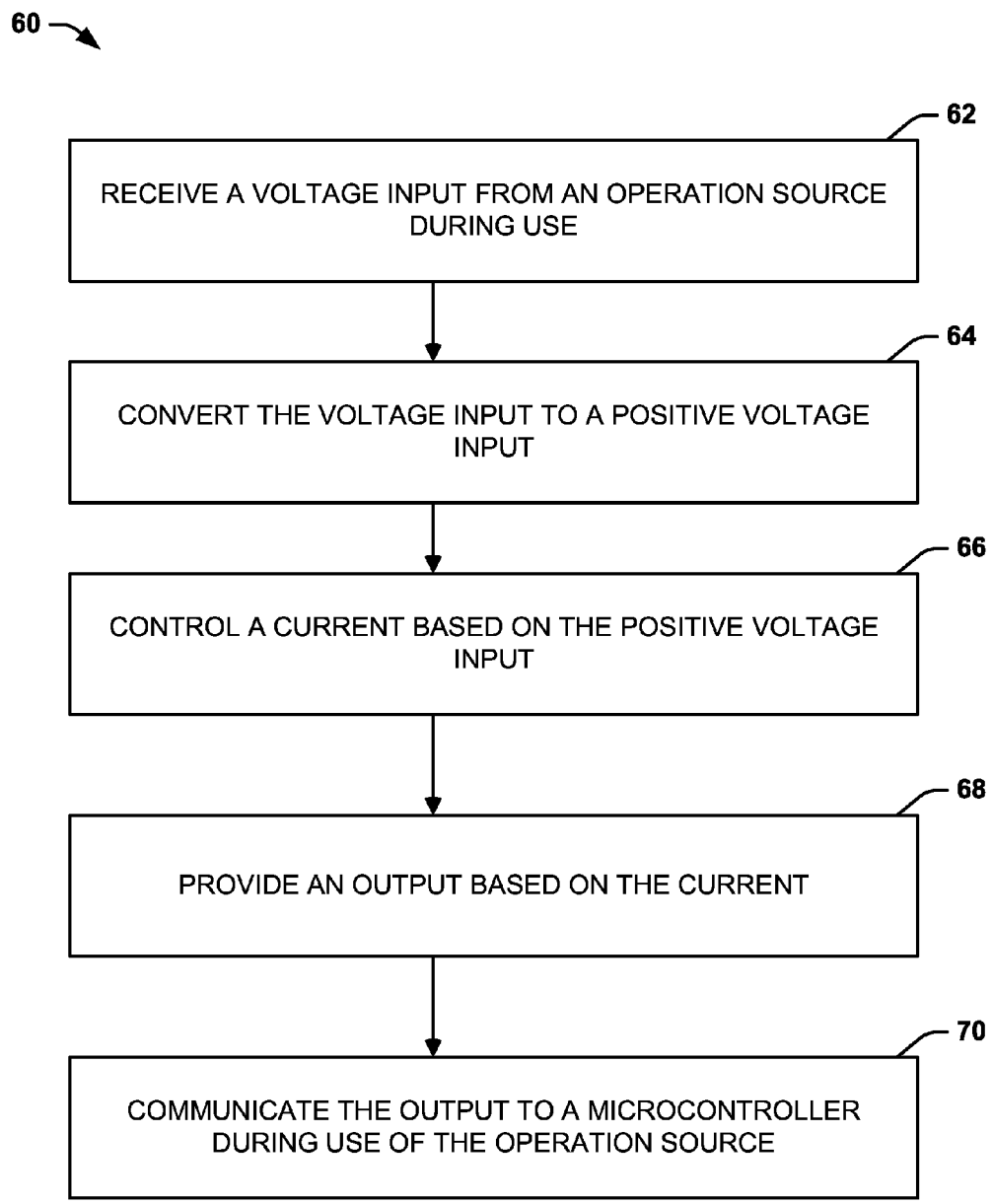
FIG. 7 is a process flow diagram of a method for electronic signal processing in accordance with another aspect of the present disclosure.

Illustrated in FIG. 7 is a method 60 for electronic signal processing in accordance with one example embodiment of the present disclosure. For example, the method for electronic signal processing can be employed with an control system 34 (e.g., to perform hour meter functionality, intelligent start/stop functionality, etc.) in outdoor power equipment. The method 60 can include, at 62, receiving, at a rectifier component 42 of a circuit, a voltage input from an operation source during use. The voltage input can indicate that the engine is running. The method 60 can also include, at 64, converting, by the rectifier component 42, the voltage input to a positive voltage input.

The method 60 can also include, at 66, controlling, by a constant current component 44 of the circuit, a current provided to an optical component 46 of the circuit based on the positive voltage input. In some instances, the constant current component 44 can, additionally or alternatively, limit the current provided to the optical component 46. The method 60 can also include, at 68, providing, by the optical component 46, an output based on the current. The output can be provided when the constant current is sufficient to activate a light component (e.g., an LED) of the optical component 46. The method 60 can also include, at 70, communicating, by the optical component 46, the output to a microcontroller. For example, the output can be provided to the microcontroller during use of the operation source.

Figure 8:
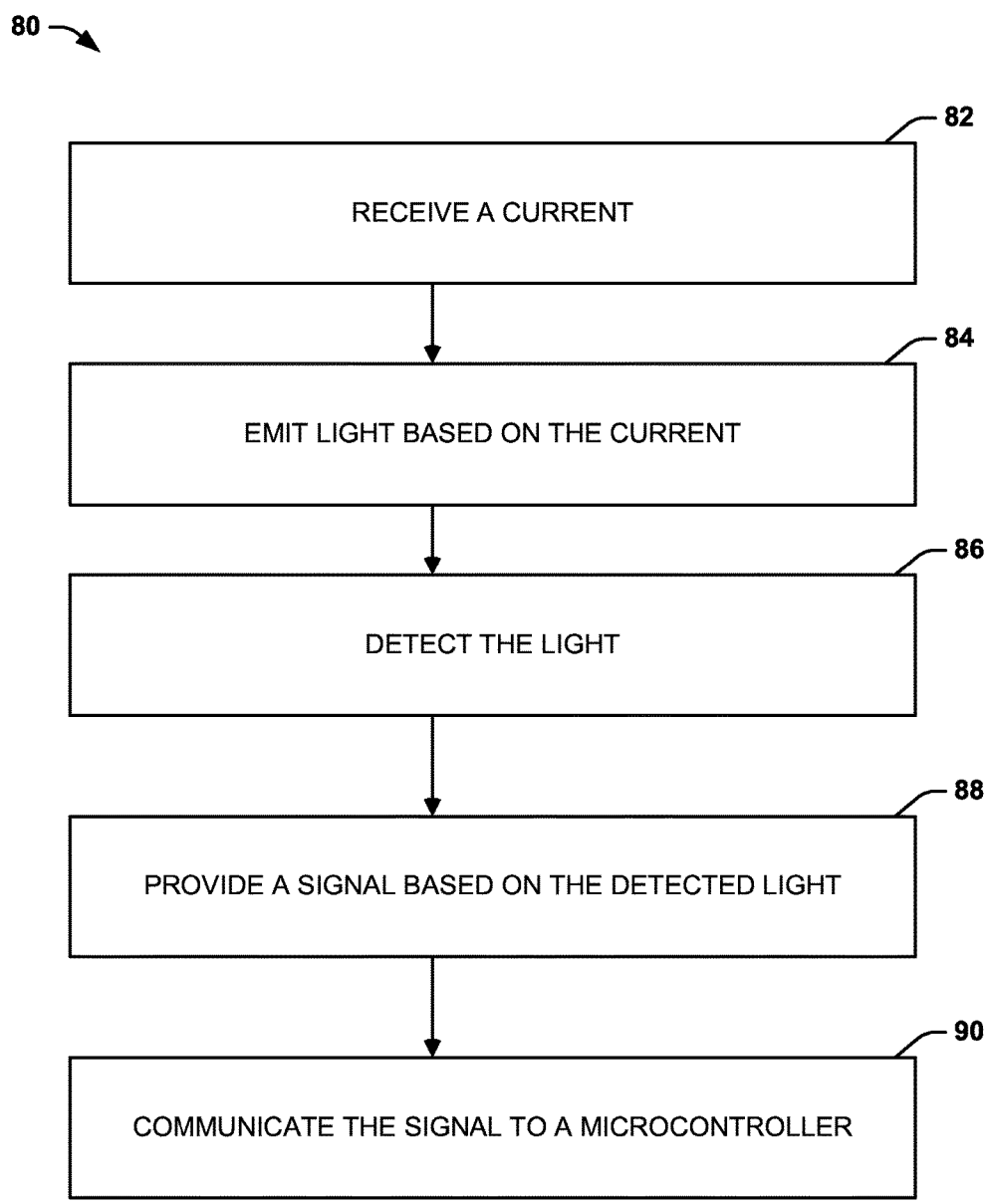
FIG. 8 is a process flow diagram of a method for providing an output of FIG. 7 to a microcontroller.

FIG. 8 is a process flow diagram of a method 80 for providing the output of FIG. 7 to the microcontroller. The method 80 can include, at 82, receiving the current from the constant current component 44. In some instances, the current can be received by an LED 52 of the optical component 46. The method 80 can also include, at 84, emitting, by LED 52, light based on the current. For example, if the current is sufficient to activate the LED 52, light can be emitted. The method can also include, at 86, detecting, by optical detector 54, the light emitted by the LED 52. The method can also include, at 88, providing a signal (e.g., Out) based on the detected light. The method can also include, at 90, communicating, by the optical detector 54, the signal to the microcontroller.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof are defined as being close to as understood by one of ordinary skill in the art. In one non-limiting embodiment, the terms are defined to be within for example 10%, in another possible embodiment within 5%, in another possible embodiment within 1%, and in another possible embodiment within 0.5%. The term "coupled" as used herein is defined as connected or in contact either temporarily or permanently, although not necessarily directly and not necessarily mechanically. A device or structure that is "configured" in a certain way is configured in at least that way, but may also be configured in ways that are not listed.

To the extent that the materials for any of the foregoing embodiments or components thereof are not specified, it is to be appreciated that suitable materials would be known by one of ordinary skill in the art for the intended purposes.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor and a non-transitory memory) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and iCs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. An control system comprising:
    an electronic signal processing system configured to convert a plurality of voltage input types to an output type comprising:
        a rectifier component to receive a voltage input from an operation source of a power equipment device during use of the power equipment device, the voltage input indicating an engine of the power equipment device is running, and to convert the voltage input to a positive voltage input, wherein the voltage input is one of the plurality of voltage input types;
        a constant current component to receive the positive voltage input from the rectifier circuit and to control a current based on the positive voltage input;
        an optical component to provide an output signal of the output type based on the current; and
    a microcontroller to perform a functionality related to control of the engine of the power equipment device during the use of the operation source based on the output signal.

2. The control system of claim 1, wherein the optical component comprises:
    a light emitting diode (LED) to receive the current and to emit light based on the current; and
    an optical detector to detect the light emitted by the LED and to communicate the output signal based on the light emitted by the LED to the microcontroller during use of the operation source of the power equipment machine.

3. The control system of claim 2, wherein the optical component isolates a battery ground from the constant current component and the LED.

4. The control system of claim 1, further comprising a filter component coupled to the electronic signal processing system to remove noise from the output signal that is communicated to the microcontroller.

5. The control system of claim 1, wherein the rectifier component comprises a bridge rectifier circuit comprising a plurality of diodes.

6. The control system of claim 1, wherein the constant current component comprises a Zener diode, at least two resistors, and at least one transistor.

7. The control system of claim 1, wherein the operation source comprises at least one of an electronic fuel pump, an electronic fuel injector, a magneto, and a signal from an electronic control unit.

8. The control system of claim 1, wherein the plurality of voltage input types comprises a positive high voltage, a negative high voltage, a positive low voltage, and a negative low voltage.

9. The control system of claim 1, wherein the voltage input is at least one of a pulsed voltage or a constant voltage.

10. A method comprising:
    receiving, at a rectifier component of an electronic signal processing system, a voltage input from an operation source of a power equipment device during use of the power equipment device, the voltage input indicating an engine of the power equipment device is running, wherein the electronic signal processing system is configured to convert a plurality of voltage input types to an output type, and wherein the voltage input is one of the plurality of voltage input types;
    converting, by the rectifier component, the voltage input to a positive voltage input;

controlling, by a constant current component of the electronic signal processing system, a current provided to an optical component of the electronic signal processing system based on the positive voltage input;

providing, by the optical component, an output signal of the output type based on the current; and communicating, by the optical component, the output signal to a microcontroller during use of the operation source, wherein the microcontroller performs a functionality related to control of the engine of the power equipment device in response to receiving the output signal.

11. The method of claim 10, wherein the communicating further comprises:

receiving, by a light emitting diode (LED) of the optical component, the current;

emitting, by the LED, light based on the current;

detecting, by an optical detector of the optical component, the light emitted by the LED; and providing, by the optical detector, the output signal based on the light emitted by the LED.

12. The method of claim 10, further comprising isolating, by the optical component, a battery ground from the constant current component.

13. The method of claim 10, further comprising removing, by a filter component of the electronic signal processing system, noise from the output that is communicated to the microcontroller.

14. The method of claim 10, wherein the voltage input comprises a negative voltage or a positive voltage.

15. An electronic signal processing device comprising:

a rectifier component to receive a voltage input from an operation source of a power equipment device during use of the power equipment device, the voltage input indicating an engine of the power equipment device is running, and to convert the voltage input to a positive voltage input, wherein the electronic signal processing device is configured to convert a plurality of voltage input types to an output type, and wherein the voltage input is one of the plurality of voltage input types;

a constant current component to receive the positive voltage input from the rectifier circuit and to control a current based on the positive voltage input; and an optical component to provide an output signal of the output type based on the current and to communicate the output to a microcontroller during the use of the operation source, wherein the microcontroller performs a functionality related to control of the engine of the power equipment device based on the output signal.

16. The electrical signal processing device of claim 15, wherein the rectifier component comprises a bridge rectifier circuit comprising a plurality of diodes.

17. The electrical signal processing device of claim 15, wherein the constant current component comprises a Zener diode, at least two resistors, and at least one transistor.

18. The electrical signal processing device of claim 15, wherein the optical component comprises:

a light emitting diode (LED) to receive the current and emits light based on the current; and an optical detector to detect the light emitted by the LED and to send the output signal based on the light emitted by the LED to the microcontroller during the use of the operation source.

19. The electrical signal processing device of claim 18, wherein the optical component isolates a battery ground from the intersection between the constant current component and the LED.

20. The electrical signal processing device of claim 15, wherein the voltage input types comprise a positive high voltage, a negative high voltage, a positive low voltage, and a negative low voltage.

* * * * *